United States Patent Office 2,946,816
Patented July 26, 1960

2,946,816
METHOD OF SYNTHESIS OF DIALKYL ALPHA-KETOGLUTARATE FROM ALKYL 2-FUROATE

Masuo Murakami, 1–39, 3-Cho, Sekimori-cho, Suma-ku, and Saburo Senoh, 274 Mori, Motoyama-cho, Nada-ku, both of Kobe-shi, Hyogo-ken, Japan No Drawing. Filed May 22, 1956, Ser. No. 586,373

Claims priority, application Japan Oct. 13, 1955

1 Claim. (Cl. 260—483)

The invention described herein pertains to a method of synthesis of dialkyl alpha-ketoglutarate, featuring the cleavage of the furan ring of alkyl 2-furoate by chlorine and a lower alkanol.

The object of this invention is to provide an improved method or procedure for facilitating the manufacturing of dialkyl alpha-ketoglutarates which can be used as a raw material for the preparation of glutamic acid or various other useful substances from readily available furfural in large quantity.

It has been previously disclosed that the alkyl 2-furoates can be prepared from furfural but it has not hitherto been known that a dialkyl alpha-ketoglutarate might be synthesized from alkyl 2-furoates.

The invention is a new method of synthesis which has not been attained hitherto, and is important due to the fact that furfural which is used as the starting substance is readily available on a commercial scale and the processes involved in the manufacture of the said compound are short and the reaction conditions can readily be attained.

Example

Through a solution of 14.0 g. of ethyl 2-furoate in 60.0 ml. of absolute ethanol is passed slowly 7.8 g. of chlorine gas with constant stirring either at room temperature or below. That the principal product of the reaction mixture is ethyl 2,5-diethoxy-2,5-dihydro-2-furoate is demonstrated by taking a portion of the reaction mixture and by treating it with a solution of 2,4-dinitrophenylhydrazine sulfate in alcohol to give ethyl alpha, delta-dioxo-beta-buten-alpha-carboxylate bis-2,4-dinitrophenylhydrazone ($C_{19}H_{16}O_{10}N_8$), M.P. 241–242° C. (dec.) with high yields.

Its analytical results are as follows:

|  | C (Percent) | H (Percent) | N (Percent) |
|---|---|---|---|
| Anal. Calc'd for $C_{19}H_{16}O_{10}N_8$ | 44.19 | 3.12 | 21.70 |
| Found | 44.46 | 3.16 | 21.83 |

The reaction mixture containing the 2,5-diethoxy-2,5-dihydro-2-furoate was then heated on a water bath under reflux conditions for several hours to convert the 2,5-diethoxy-2,5-dihydro-2-furoate to diethyl alpha-ketoglutarate. In order to prove that diethyl alpha-ketoglutarate was actually formed, a portion of this final reaction mixture was treated with a solution of 2,4-dinitrophenylhydrazine sulfate in ethanol, thus obtaining diethyl alpha-ketoglutarate 2,4-dinitrophenylhydrazone, M.P. 88–89° C., in high yields. Its analysis is given below:

|  | C (Percent) | H (Percent) | N (Percent) |
|---|---|---|---|
| Anal. Calc'd for $C_{15}H_{18}O_8N_4$ | 47.12 | 4.75 | 14.66 |
| Found | 47.13 | 4.76 | 14.73 |

If desired, the reaction mixture containing the 2,5-diethoxy-2,5-dihydro-2-furoate can be saturated with hydrogen chloride gas before heating to form the diethyl alpha-ketoglutarate.

It is also possible to obtain diethyl alpha-ketoglutarate, B.P. 116–118° C./4 mm., in a theoretical yield of over 70% by distilling under vacuum the residue obtained after removing the solvent from the reaction mixture containing the diethyl alpha-ketoglutarate.

When methyl 2-furoate and methanol are used instead of the ethyl derivative and ethanol used in this case, dimethyl alpha-ketoglutarate is obtained in approximately the same high yield.

Since it is possible to see numerous variations of the procedures given above without altering the feature and principle of the said invention, the said invention is by no means avoided by any minor changes employed within the scope claimed hereafter.

What we claim is:

A method for the production of a lower dialkyl alpha-ketoglutarate consisting essentially of reacting a lower alkyl-2-furoate with a lower alkanol and chlorine at a temperature not exceeding room temperature, and then forming said alpha-ketoglutarate by heating the resulting reaction mixture under reflux conditions.

References Cited in the file of this patent

UNITED STATES PATENTS

| 2,436,532 | Singleton | Feb. 24, 1948 |
| 2,475,097 | Jones | July 5, 1949 |
| 2,515,304 | Jones | July 18, 1950 |

OTHER REFERENCES

Dunlop et al.: "The Furans" (1953), pages 390–1, 496.

Hachihama et al.: Chem. Abs. 50, 12015a (1956) (J. Chem. Soc. Japan, Ind. Chem. Sec. 58, 806 (1955)).

Murakami et al.: Chem. Abs. 51, 5745–5747 (1957) (Mem. Inst. Sci. Ind. Research, Osaka Univ., 13, 173–183 (1956).